United States Patent [19]
Kesler et al.

[11] Patent Number: 5,810,094
[45] Date of Patent: Sep. 22, 1998

[54] HEAD/PRE-AMP RIBBON INTERCONNECT FOR DATA STORAGE DEVICES

[75] Inventors: Matt C. Kesler, Phoenix; J. Scott Reynolds, Tempe, both of Ariz.

[73] Assignee: W. L. Gore & Associates, Inc., Newark, Del.

[21] Appl. No.: 647,183

[22] Filed: May 9, 1996

[51] Int. Cl.⁶ ................................................. H01B 7/04
[52] U.S. Cl. ........................................ 174/117 F; 360/104
[58] Field of Search .................... 174/117 F, 117 FF; 360/103, 104, 105

[56] References Cited

U.S. PATENT DOCUMENTS

| | | | |
|---|---|---|---|
| 3,696,351 | 10/1972 | Groom et al. | 340/174.1 |
| 4,141,050 | 2/1979 | Wiseley | 360/104 |
| 4,197,154 | 4/1980 | Pfaff, Jr. | 156/355 |
| 4,468,089 | 8/1984 | Brorein | 385/114 |
| 4,616,279 | 10/1986 | Poorman | 360/103 |
| 4,616,717 | 10/1986 | Luetzow | 174/117 F |
| 4,789,914 | 12/1988 | Ainslie et al. | 360/103 |
| 5,015,800 | 5/1991 | Vaupotic et al. | 174/34 |
| 5,060,099 | 10/1991 | Yaeger et al. | 360/105 |
| 5,103,359 | 4/1992 | Marazzo | 360/104 |
| 5,579,189 | 11/1996 | Morehouse et al. | 360/105 |

*Primary Examiner*—Kristine L. Kincaid
*Assistant Examiner*—Marc D. Machtinger
*Attorney, Agent, or Firm*—Victor M. Genco, Jr.

[57] ABSTRACT

In a data storage device, a ribbon interconnect for electrically connects a read/write head to an electrical circuit component. The read/write head id defined by separate read and write transducer elements. The interconnect has at least one carrying medium; and at least three conductors captured by the carrying medium in a coplanar arrangement. The at least three conductors define asymmetrical pitches. Each pair of the at least three conductors define a predetermined complex impedance. The individual complex impedances are not equal. The carrying medium may be a polymeric film. The at least three conductors are substantially cylindrically shaped and may be adhesively captured by the carrying medium. The ribbon interconnect may include at least one conductive ground plane. An insulation material may be disposed about each of the at least three conductors.

13 Claims, 6 Drawing Sheets

HEAD/PRE-AMP RIBBON INTERCONNECT FOR DATA STORAGE DEVICES

FIELD OF THE INVENTION

This invention generally relates to data storage devices. More particularly, the present invention relates to an improved electrical interconnect for electrically coupling a transducer head to electronic circuitry of a data storage device.

BACKGROUND OF THE INVENTION

Disc drive machines record and reproduce information stored on a recording medium. Typical hard disc drives include one or more vertically aligned, rotating information storage discs, each having at least one associated slider. On one surface of each slider is affixed or fabricated one or more read/write transducer(s) ("heads"), which are adapted to transfer information between the disc and an external computer system. The information storage discs are held by a spindle motor assembly capable of rotating the discs at high speeds. The sliders are carried by a plurality of vertically-aligned, elongated flexure arms that in turn are carried by a head positioner assembly. The head positioner assembly is adapted to move the sliders back and forth in unison across the face of the vertically-aligned discs. The head positioner assembly is traditionally either rotationally mounted, or is in the form of a carriage that is free to move back and forth along a single axis. In either case, the head positioner assembly is adapted to precisely position the transducer heads relative to the magnetic information storage discs.

In the typical operation of such a disc drive, the sliders rest on landing zones on the surface of their associated discs when the power is off. In operation, the drive unit is powered up and the disc pack begins to rotate. Once the disc reaches a certain critical speed, the sliders rise slightly off the landing zone under the lifting influence of a small air bearing which is created by the speed of rotation of the discs. During normal operation, the sliders, which remain floating above the discs, are said to "fly" over the discs, thereby preventing wear on the disc surfaces and potential destruction of the data.

Typically, the transducer head of the disc drive is electrically connected to an active device, such as a pre-amplifier for example, by way of an electrical interconnect. One interconnect may be attached to each transducer head of the disc drive. All such interconnects may be attached to a single active device, or to other interconnects, such as printed circuit boards or flexible printed circuitry, which are connected to the active device(s).

Such a data storage device may employ read/write heads which comprise one transducer which writes data onto the storage medium and another transducer which reads data from the medium. Signals may be sent from other components within the data storage device to the write transducer using two or more conductors. Signals may be read from the read transducer using two or more conductors. The read conductors may be distinct from the write conductors, and the electrical characteristics of the write conductors, which optimize the write function, may differ from the electrical characteristics of the read conductors, which optimize the read function.

It is desired to optimize the rate at which data can be written onto the storage medium, and to optimize the rate at which data can be read from the storage medium. To optimize each of these data rates requires that the design of the interconnection be chosen so as to be compatible with the devices connected together by the interconnection. The electrical characteristics, such as the resistance of the read transducer, are generally not the same as the electrical characteristics of the write transducer. The electrical characteristics of the part of the disc drive to which the write transducer is connected are generally not the same as the electrical characteristics of the part of the disc drive to which the read transducer is connected. It is therefore desirable to separately optimize the electrical characteristics of the write conductors and the read conductors. It is possible that one conductor may be used by both read and write circuits. Thus, the total number of conductors may be three or more.

The proper functioning of the disc drive is dependent upon the design of the interconnect. More particularly, each transducer head must be free to move in one or more dimensions, such as pitch, roll, and/or yaw, to maintain its precise positioning with respect to a disc surface. If the mechanical characteristics of the interconnect, including its stiffness and its spring constant, are such as to constrain the movement of the "flying" transducer head, any imperfection in the surface of the spinning disc may result in improper positioning of the transducer head.

The electrical characteristics of the interconnect must permit the reading and writing of data at a rate consistent with the design of the transducer head and a preamplifier, or other active device to which the interconnect is attached. To achieve such electrical characteristics, the conductors within the interconnect should possess one or more of the following characteristics: low inductance, low capacitance, low resistance, or a low complex characteristic impedance. Also, to achieve such electrical characteristics, shielding may be required within the interconnect to control one or more of the following: inductance, capacitance, resistance, complex characteristic impedance, electrical cross-talk from one conductor to another, or electromagnetic interference.

One type of interconnect which has been employed in the past is a twisted wire interconnect. Such an interconnect is typically formed of two or more 48 AWG wires. Each wire is insulated with a non-conductive material, such as polyurethane, in a thickness of about five microns. The wires may be twisted all together, or may be twisted in smaller groups, such as pairs, and the smaller groups then assembled together. The twisted wires may then be placed in a tube of an insulating material, such as a fluoropolymer, such that the ends of the wires extend beyond the ends of the tube. The ends of the individual wires may be stripped of their insulation to permit the wires to be bonded to flat metallic pads, or the wires may be attached by bonding through the insulation. The wires may be plated with a noble metal, such as gold, which is not prone to oxidation to thereby provide a superior bond to the metallic pads.

Twisted wire interconnects typically have capacitance of approximately 2 picofarads per inch; inductance of approximately 5 nanoHenrys per inch; and characteristic differential impedance of approximately 70 ohms.

Although the twisted wire interconnects are readily available, may be produced in mass quantities, and provide reliable bonding, these interconnects suffer from shortcomings which detract from their usefulness. More particularly, each end of each wire must be independently identified and located upon a bond pad prior to bonding, which is a laborious and error-prone process step. Also, because the individual wires are moveable relative to the tube and to the other wires, these interconnects are not compatible with completely automated assembly methods. Additionally, the electrical characteristics of this type of interconnect cannot be readily varied. For example, it is not possible to achieve very low levels of inductance and capacitance with insulation thickness compatible with high yields; that is, inductance can only be reduced by reducing the thickness of the insulation, which may result in reduced assembly process yields due to nicking of the conductors. Finally, an effect known as the "proximity effect" causes electrical resistance at high frequencies to be greater than that of other types of interconnects.

Another type of interconnect which has been used in the past is a flexible printed circuit. This flexible printed circuit may be fabricated and then attached to the stainless steel suspension which supports the head, or it may be fabricated as an integral part of the suspension by a process of lamination and etching. Such a flexible printed circuit typically consists of one or more dielectric layers, which are not electrically conductive, alternating with one or more printed copper layers. A ground plane may be included over the whole area of the circuit or only in certain regions. This ground plane may enhance electromagnetic noise rejection and/or may be used to enhance the electrical characteristics of one or more conductors (for example by reducing the inductance).

A flexible printed circuit interconnect enables the automated installation thereof within a disc drive assembly, enables some control of the electrical properties of the interconnect, and is less subject to the "proximity effect". However, this type of interconnect is expensive to manufacture, employs bonding techniques which differ from those widely used in making such data storage devices and which may present cost and/or reliability challenges, and the achievement of very low levels of inductance (e.g. less than 3 nanoHenrys per inch of length) and/or very low levels of capacitance (e.g. less than 0.5 pico-Farads per round-trip inch of length) may not be possible with common fabrication methods.

The foregoing illustrates limitations known to exist in present interconnects in data storage devices. Thus, it would be advantageous to provide an improved interconnect directed to overcoming one or more of the limitations set forth above. Accordingly, a suitable alternative is provided including features more fully disclosed hereinafter.

SUMMARY OF THE INVENTION

The present invention advances the art of interconnects for data storage devices, and the techniques for creating such interconnects, beyond that which is known to date. In one embodiment of the present invention, in a data storage device, a ribbon interconnect is provided for electrically connecting a read/write head to an electrical circuit component. The read/write head is defined by separate read and write transducer elements. The interconnect comprises at least one carrying medium; and at least three conductors captured by the carrying medium in a coplanar arrangement. The at least three conductors define asymmetrical pitches. Each pair of two of the at least three conductors define a predetermined complex impedance. The individual complex impedances are not equal from one pair to another. The carrying medium may be a polymeric film. The at least three conductors are substantially cylindrically shaped and may be adhesively captured by said carrying medium. The ribbon interconnect may include at least one conductive ground plane. An insulation material may be disposed about each of the at least three conductors.

It is a purpose of the present invention to provide an interconnect for electrically connecting three or more metallic pads of a read/write transducer head with three or more metallic pads on the surface of a rigid, printed circuit, or a flexible printed circuit.

Another purpose of the present invention is to provide such an interconnect using wire-bonding methods which have been proved reliable and cost-effective in this environment, and which may be used without large new investments in processing equipment.

Another purpose of the present invention is to provide such an interconnect which permits the read/write transducer head of a disc drive to move freely in two or more dimensions and/or rotate about one or more axes while flying near the surface of the data disc.

Yet another purpose of the present invention is to provide such an interconnect using fabrication methods which are continuous in nature, and therefore, cost-effective in high volume production.

Still another purpose of the present invention is to provide such an interconnect which prevents conductors from contacting other conductors or conductive components within a data storage device.

Still another purpose of the present invention is to provide such an interconnect which is constructed of materials which do not outgas during operation or assembly of the data storage device to a degree which interferes with the operation of this device over its useful life.

Yet another purpose of the present invention is to provide an interconnect that optimizes the rate at which data can be written onto a storage medium, and that optimizes the rate at which data can be read from the storage medium.

BRIEF DESCRIPTION OF THE DRAWINGS

The foregoing summary, as well as the following detailed description of a preferred embodiment of the invention, will be better understood when read in conjunction with the appended drawings. For purposes of illustrating the invention, there is shown in the drawings an embodiment which is presently preferred. It should be understood, however, that the invention is not limited to the precise arrangement and instrumentality shown. In the drawings.

DETAILED DESCRIPTION OF THE INVENTION

Figure 1:
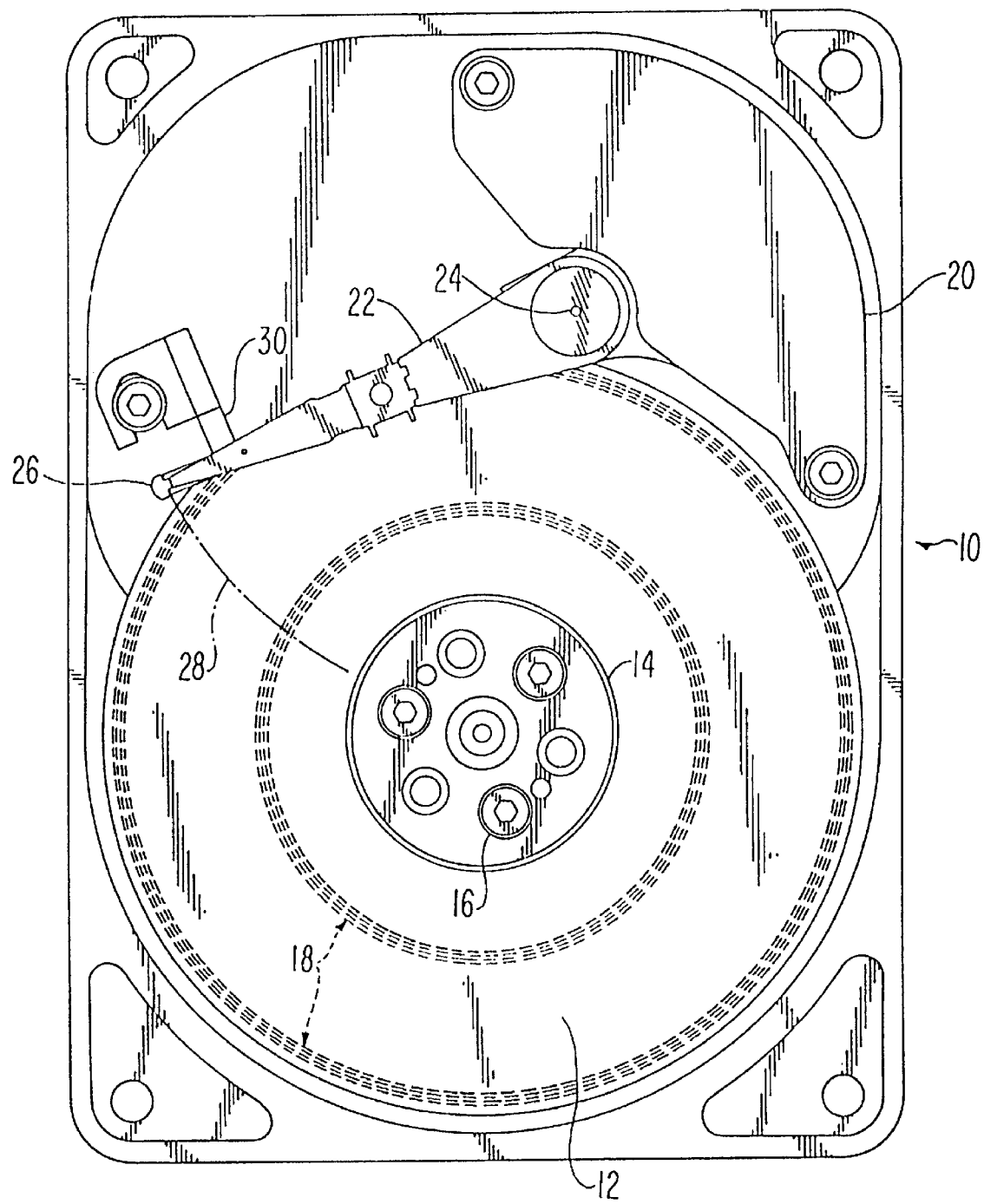
FIG. 1 is a plan view of a disc drive assembly in which the present invention is particularly useful.

Shown in FIG. 1 is a plan view of a disc drive 10 which incorporates a plurality of discs 12 mounted on a spindle motor by a disc clamp 14 and a plurality of screws 16. Each disc 12 contains a number of concentric, circular data tracks 18 on which data is written and from which data is read. An actuator motor, shown generally at 20, serves to pivot a plurality of head mounting arms 22 about a pivot point 24. Mounted to each head mounting arm 22 is a load beam/gimbal/head assembly 26 which is moved back and forth across the discs 12, along arc 28, in order to access the data tracks 18.

Figure 2:
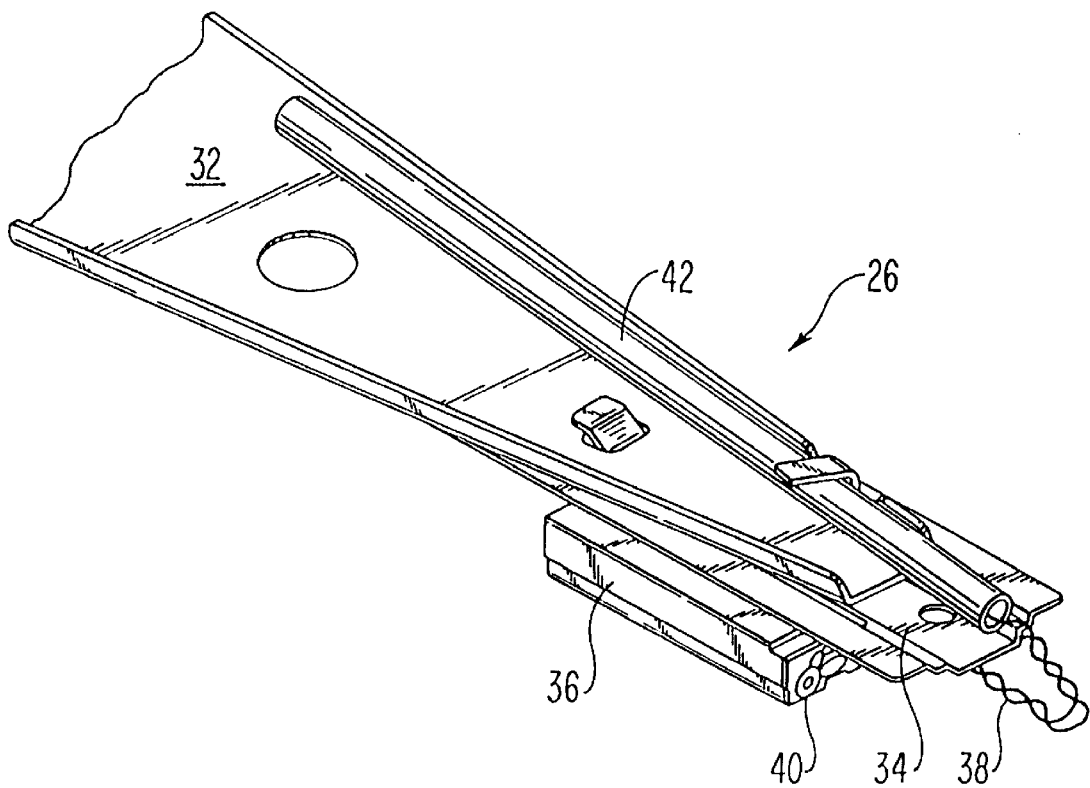
FIG. 2 is a partial perspective view of a prior art read/write transducer head assembly having a twisted wire interconnect.

FIG. 2 illustrates a prior art load beam/gimbal/head assembly 26 including a load beam 32, a gimbal 34, a transducer head/slider assembly 36 and a twisted pair type interconnect 38, used to connect electrical signals to and from the read/write transducer head 40 with an active device (not shown), such as a pre-amplifier. As should be understood, the twisted pair type interconnect 38 comprises insulated conductors which are independently moveable relative to each other and to a containing tube 42.

Figure 3:
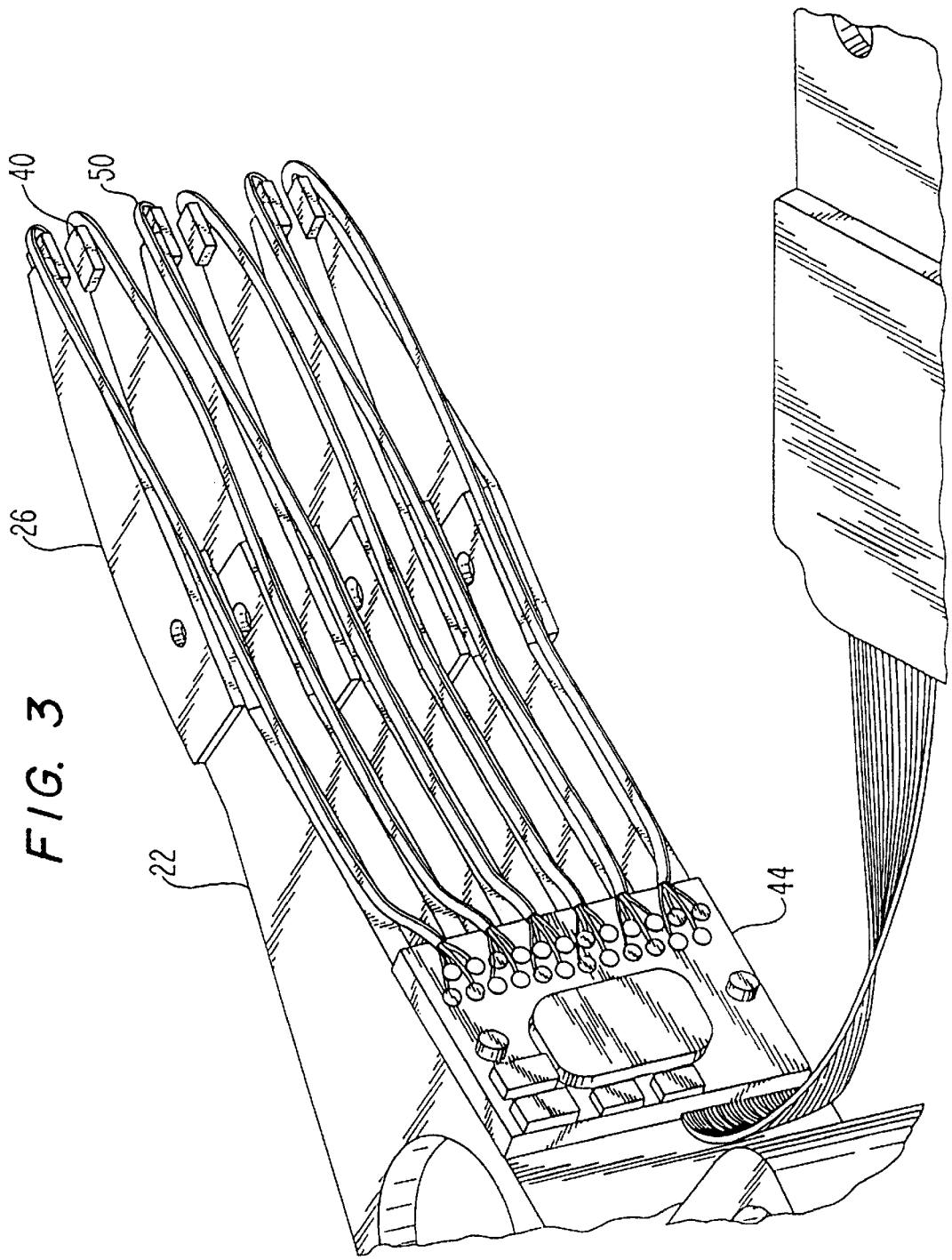
FIG. 3 is a partial perspective view of a read/write transducer head assembly having the ribbon interconnect of the present invention.

As best seen by reference to FIG. 3, according to the present invention, the read/write transducer head 40 is connected to an active electronic device 44, which is illustrated as a pre-amplifier, by a novel ribbon interconnect 50. (An extension of the same ribbon interconnect 50 may also be utilized to connect the elements of an active electronic device to circuits and/or equipment.) However, the invention is primarily concerned with the connections between the read/write head and an active electronic device. The ribbon interconnect 50 can be bent or turned to accommodate electrical connection without adversely affecting the "flying" performance of the read/write transducer head 40.

Figure 4:
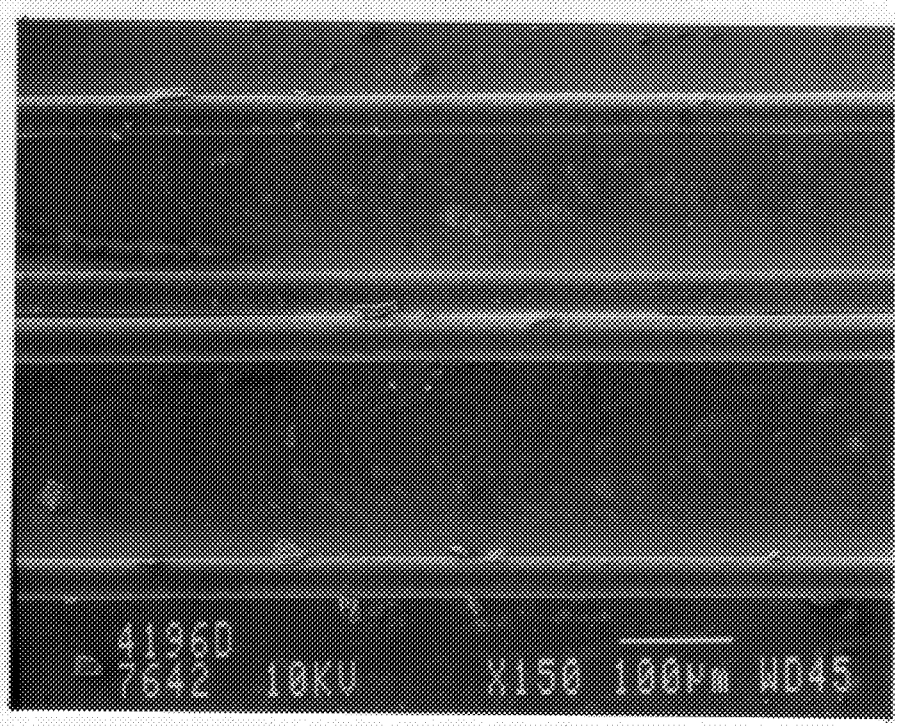
FIG. 4 is a scanning electron micrograph (SEM) illustrating a plan view of one embodiment of the present invention.
Figure 5:
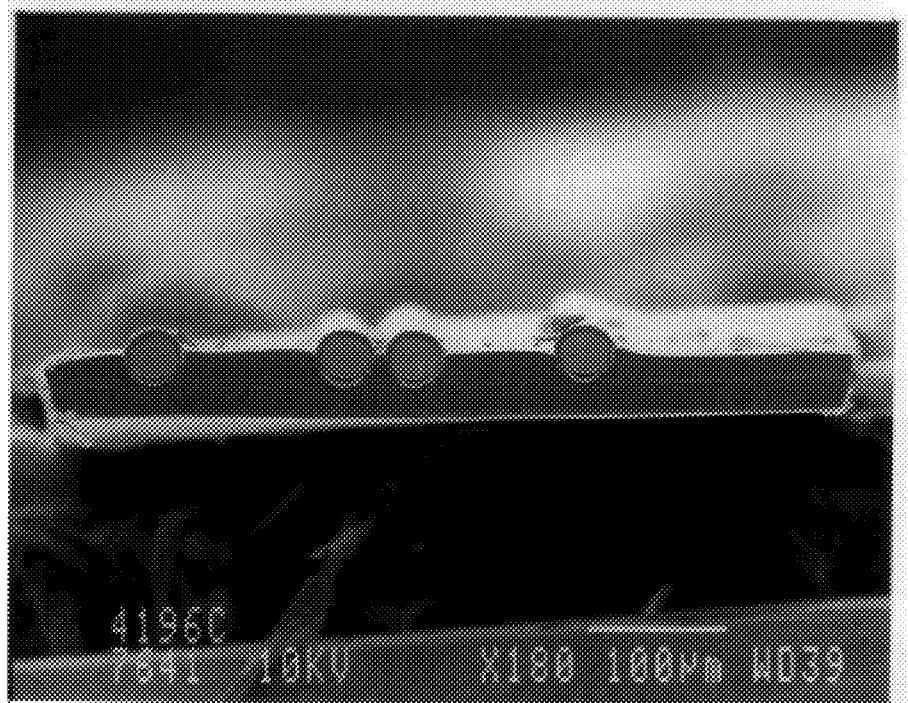
FIG. 5 is an SEM illustrating a side sectional view of the embodiment of the invention of FIG. 4.
Figure 6:
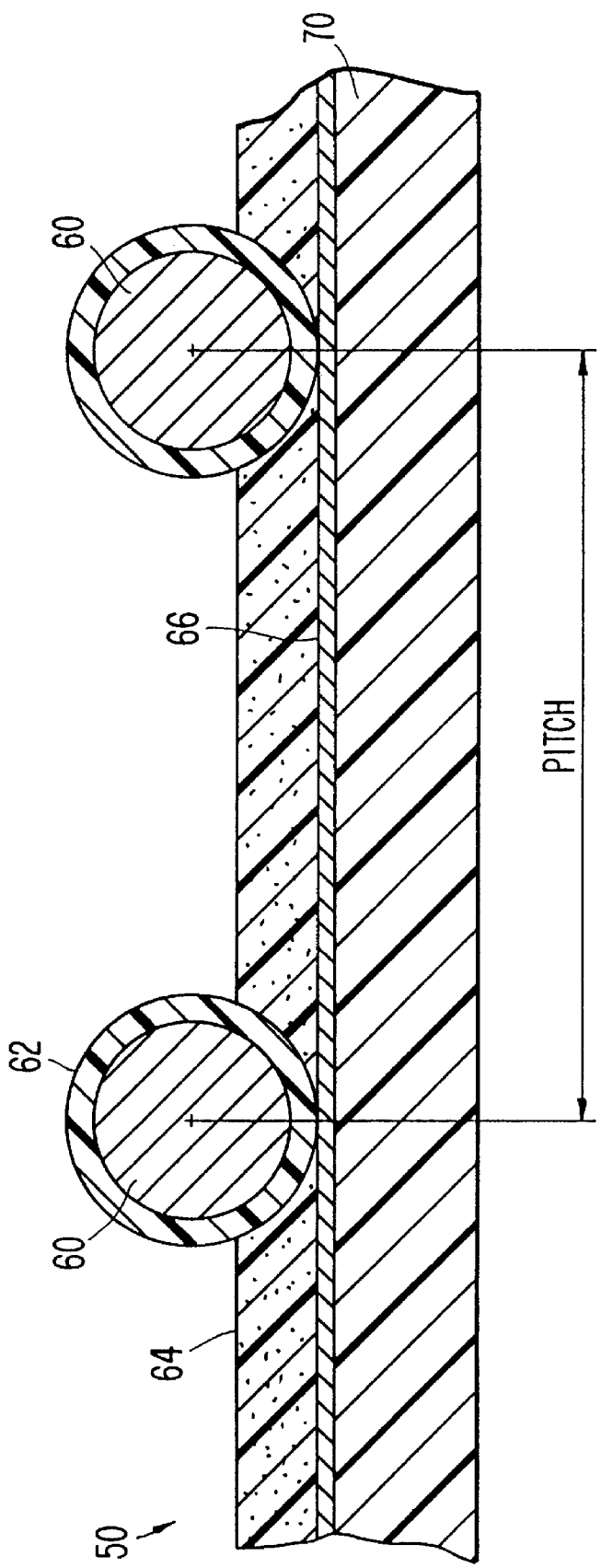
FIG. 6 is an enlarged partial side sectional view of one embodiment of the present invention.
Figure 7:
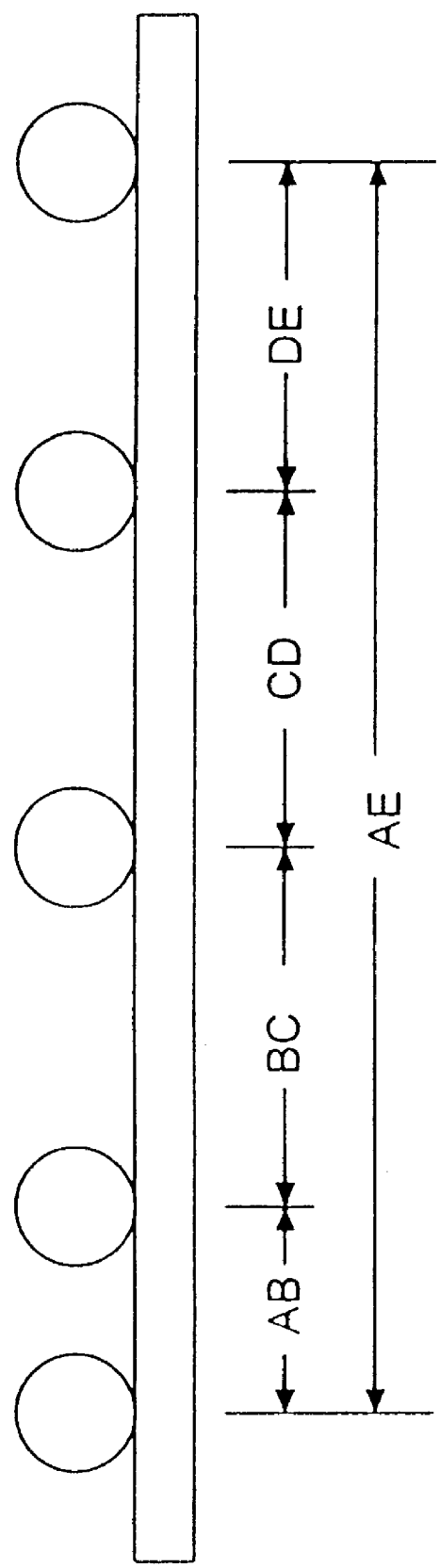
FIG. 7 is a schematic view of the interconnect of the present invention useful in interpreting Table 1.

The novel ribbon interconnect of the present invention is best understood by reference to FIGS. 4–6. As seen therein, the ribbon interconnect comprises at least three cylindrically shaped conductors 60 and at least one support ribbon or tape 70.

It is well-known that the electrical characteristics of conductors which are insulated but not individually shielded depends strongly on the proximity of adjacent conductors. For round wires in a ribbon cable, for example, given that there is no conductive ground plane, the external inductance is approximately proportional to the inverse hyperbolic cosine of the ratio of the center-to-center spacing of the wires to the diameter of the wires. Capacitance is generally inversely proportional to inductance; thus, designs which have lower inductance generally have higher capacitance.

The operating speed, or data rate of some circuits, can be improved by a reduction in capacitance. For example, some inductive write transducers can be operated in circuits with higher resonant frequency if the capacitance of the interconnect is reduced. The operating speed or data rate of some other circuits can be improved by a reduction in inductance. For example, some magnetoresistive read transducers can be operated in circuits with higher data transfer rate if the inductance of the interconnect is reduced.

It is therefore desirable to provide an electrical interconnect such that the electrical characteristics of the interconnect which affect the read circuit are independent of the electrical characteristics of the write circuit. This is not readily achieved when the interconnect is composed of twisted wires, since twisting produces a conductor pair with center-to-center distance equal to the conductor diameter plus twice the insulation thickness.

Arrangement of the conductors in a coplanar ribbon also enables the inclusion of one or more conductive layer(s) parallel to the plane of the conductors. Such an arrangement is not possible if the conductors are twisted. The use of such a conductive layer means that the distance from the conductive layer to each conductor is consistent along the length of the interconnect and can be controlled by the use of one or more nonconductive layers and/or variation of the thickness of the insulation surrounding each conductor. The inclusion of such a conductive layer has been found to reduce inductance and increase capacitance. Such a conductive layer may also be included under and/or over some conductors but not others.

The shape of the conductors 60 is an essential feature of the present invention. As should be understood, the cylindrically shaped conductors provide for effective multi-axis movement, which permits the read/write transducer head 40 to move freely while "flying" from the surface of the data disc. The cylindrical conductors may be an appropriate size, such as 48 AWG for example. The conductors may be plated with a noble metal, such as gold, so that bonding to flat metallic pads is enabled by conventional bonding methods. The individual conductors may be individually insulated with a suitable insulation 62, such as for example polyurethane, polyimide, porous polytetrafluoroethylene, polytetrafluoroethylene, or fluorinated ethylenepropylene. The conductors may be insulated by conventional methods such as by extrusion, tape wrapping or dip coating, for example. It is anticipated that a material may be employed for the conductor insulation which has a higher melt temperature than the material used for the adhesive to facilitate processing in certain instances. Also, the conductors may be coated with a conductive material, such as but not limited to, copper, aluminum, gold, silver, a carbon-loaded fluoropolymer, a plated polymer, a plated fluoropolymer, or a plated porous polytetrafluoroethylene, prior to inclusion in the interconnect.

The at least one support ribbon or tape 70 may be a fluoropolymer such as porous polytetrafluoroethylene, polytetrafluoroethylene, fluorinated ethylenepropylene, or perfluoroalkoxy polymer, or a film such as polyester or polyimide.

As the term is used herein, porous polytetrafluoroethylene (PTFE) shall mean a membrane which may be prepared by any number of known processes, for example, by stretching or drawing processes, by papermaking processes, by processes in which filler materials are incorporated with the PTFE resin and which are subsequently removed to leave a porous structure, or by powder sintering processes. Preferably, the porous polytetrafluoroethylene membrane is porous expanded polytetrafluoroethylene membrane having a microstructure of interconnected nodes and fibrils, as described in U.S. Pat. Nos. 3,953,566 and 4,187,390, which are incorporated herein by reference, and which fully describe the preferred material and processes for making them.

Referring to FIGS. 4–6, the ribbon interconnect 50 may comprise a plurality of embodiments. More particularly, as illustrated in FIG. 4, the ribbon interconnect 50 may include a first tape 70, a layer of adhesive 64, and a plurality of cylindrically shaped conductors 60. Suitable adhesives include, but are not limited to, thermoplastics, such as polyester and/or thermosets such as epoxies. In addition to the foregoing, one or more ground planes 66 may be included in any embodiment of the present invention. Suitable ground plane material may be metal or another conductive material. One or more tapes 70 may be used. Each tape must be approximately the width of the finished cable, or wider. A layer of adhesive 64, may not be needed if process temperatures are such that some or all of the tapes will reflow. Alternately, one or more adhesive layers may be used either as free films and/or as coatings on one or more of the tapes. Examples of specific embodiments of the present invention are outlined in the following table.

TABLE 1

| Sample: | 1 | | 2 | | 3 | | 4 | | 5 | | 6 | | 7 | |
|---|---|---|---|---|---|---|---|---|---|---|---|---|---|---|
| Primary insulation: | Heavy build (1) | | Heavy build (1) | | Heavy build (1) | | Heavy build (1) | | Heavy build (1) | | Single build (2) | | Single build (2) | |
| Ground plane material | Cu | | Cu | | Cu | | Al | | Al | | Al | | Al | |
| Nominal ground plane thickness: | 5 microns | | .1 microns | | .025 microns | | .1 microns | | .025 microns | | .025 microns | | .025 microns | |
| Nominal adhesive thickness | 13 microns | | 13 microns | | 13 microns | | 13 microns | | 13 microns | | 13 microns | | 51 microns | |
| Measurement | pitch | Z | pitch | Z | pitch | Z | pitch | Z | pitch | Z | pitch | Z | pitch | Z |
| AB | 0.002 | 65 | 0.003 | 77 | 0.003 | 76 | 0.003 | 77 | 0.003 | 77 | 0.003 | 68 | 0.004 | 90 |
| AC | 0.006 | 73 | 0.006 | 96 | 0.006 | 97 | 0.006 | 97 | 0.006 | 96 | 0.006 | 93 | 0.008 | 101 |
| AD | 0.009 | 75 | 0.010 | 103 | 0.010 | 107 | 0.006 | 97 | 0.010 | 106 | 0.009 | 110 | 0.013 | 105 |
| AE | 0.013 | 75 | 0.014 | 106 | 0.013 | 105 | 0.013 | 105 | 0.013 | 106 | n/a | n/a | n/a | n/a |
| BC | 0.004 | 73 | 0.003 | 83 | 0.003 | 86 | 0.003 | 86 | 0.003 | 83 | 0.003 | 83 | 0.004 | 91 |
| BD | 0.007 | 71 | 0.007 | 95 | 0.007 | 101 | 0.007 | 97 | 0.007 | 101 | 0.007 | 99 | 0.009 | 105 |
| BE | 0.011 | 70 | 0.011 | 91 | 0.011 | 106 | 0.010 | 105 | 0.010 | 103 | n/a | n/a | n/a | n/a |
| CD | 0.003 | 70 | 0.004 | 85 | 0.004 | 87 | 0.004 | 86 | 0.003 | 86 | 0.004 | 87 | 0.005 | 89 |
| CE | 0.007 | 73 | 0.007 | 99 | 0.007 | 99 | 0.007 | 99 | 0.007 | 98 | n/a | n/a | n/a | n/a |
| DE | 0.004 | 71 | 0.004 | 87 | 0.004 | 87 | 0.004 | 87 | 0.004 | 90 | n/a | n/a | n/a | n/a |

(1) Refers to the thickness of the polyurethane insulation around each conductor. Typically 3 to 4 microns.
(2) Refers to the thickness of the polyurethane insulation around each conductor. Typically 4 to 5 microns.
Z: The differential characteristic impedance.
The term "PITCH" is used to define the center-to-center distance between conductors.

The invention of this disclosure is an electrical interconnect designed to connect a read/write transducer to other circuit components. The read/write transducer may have three or more bond pads which may be metal pads located on one or more surface(s) of the transducer. The conductors of the interconnect may be connected to the pads by means of ultrasonic bonding or other means. The conductors may be positioned within the interconnect such that they are well-aligned with the locations of the pads on the transducer, thus simplifying the process of connecting the interconnect to the transducer.

On the other end, bond pads may be positioned such that the interconnect can be connected to other circuit elements by ultrasonic bonding, soldering, or other means.

Compared with twisted wires, the present method may be preferred because the electrical characteristics of the read circuit and the electrical characteristics of the write circuit can be independently controlled so as to optimize both the read and write functions.

Compared with flexible printed circuits and other photolithographically produced interconnects, the present method may be preferred because the conductors are round and can therefore be connected to the transducer and/or to other system components using proven ultrasonic wire-bonding methods and/or soldering methods. It also may be preferred since the interconnects of this invention can be produced using primarily continuous processes compared with the expensive discrete lamination processes used to produce flexible printed circuits. Thus, both capital equipment costs and costs per interconnect can be minimized.

The interconnect of this invention may also be preferred to an interconnect made by photolithographic processes because the conductors can be extended from the carrying medium at one end or at both ends of the interconnect such that the conductors can cross one another so as to connect to pads in various locations. This is not readily achieved with printed circuit technology.

Tooling to construct the ribbon interconnect of the present invention consists of machined drums and/or rollers, such that the ribbon interconnect materials provided above are formed together, by a continuous process, under heat and/or pressure. Conductors and/or tapes may be guided so that their positions with respect to each other are controlled. Tooling may be machined so as to hold each wire in position. Tooling may also be heated, and/or heat may be applied to some or all of the cable materials before they enter the tooling. The tooling may impose a cross-sectional shape on the materials which requires deformation of some or all of the materials. Process temperatures and the time at which the materials are held at elevated temperature are chosen such that reliable bonds are formed between the tapes and the conductors, between two or more tapes, and/or between the tapes and the insulation of the conductors.

After the ribbon interconnect is formed, it may be necessary to trim the edges to remove excess material and to control the dimensions of the finished interconnect and/or the distance from each edge to each conductor. This may be done by any suitable method such as by rolling blades, by stationary blades, and/or by laser. The interconnect of the present invention may be prepared for termination by stripping a portion of the tape 70 near one end or both ends to expose the conductors 60. The tape 70 should be stripped such that the insulation, if any, of the individual conductors remains in place over a portion of the free length of the conductors. As a result, one or more conductors may be free to move independent of the others, thus enhancing the ability of the head to maintain a satisfactory location with respect to the surface of the data storage media. If uninsulated conductors have been employed, the tape 70 may be stripped in such a fashion that the tape itself is operable to insulate the individual conductors. The insulation material surrounding one or more of the conductors may be completely removed in a region surrounding the conductor such that the metal surface is exposed and can be bonded to a metal pad using common methods.

A laser may be employed to strip the portion of the tape 70 from the ribbon interconnect. The laser employed should have adequate beam size and control, such as an excimer laser for example. The laser beam may be split such that two or more beams are formed. One beam may strike each of the two flat surfaces of the ribbon cable at the same plane location at the same time. The beams and/or the ribbon interconnect may be moved such that the laser beam(s) scan the surface of the interconnect in a direction normal to the conductors. The depth to which the beam(s) remove material may be controlled by adjusting the focal plane of the beam(s) with respect to the plane of the conductor centers and/or by adjusting beam parameters such as pulse shape and duration. This cutting depth may be adjusted as the beam(s) scan(s), so as to leave a layer of insulation on each conductor.

Although a few exemplary embodiments of the present invention have been described in detail above, those skilled in the art readily appreciate that many modifications are possible without materially departing from the novel teachings and advantages which are described herein. Accordingly, all such modifications are intended to be included within the scope of the present invention, as defined by the following claims.

Having described the invention, what is claimed is:

1. In a data storage device, a ribbon interconnect for electrically connecting a read/write head to an electrical circuit component, the read/write head being defined by separate read and write transducer elements, the interconnect comprising:
   at least one carrying medium; and
   at least three conductors captured by the carrying medium in a coplanar arrangement, the at least three conductors defining asymmetrical pitches, wherein a complex impedance is defined between each pair of two of the at least three conductors, wherein the individual complex impedances are not equal from one of said pairs to another, wherein when the ribbon interconnect is electrically connected to the read/write head, the read/write head is freely moveable with respect to said ribbon interconnect.

2. The invention of claim 1, wherein said carrying medium is a polymeric film.

3. The invention of claim 1, wherein the at least three conductors are substantially cylindrically shaped.

4. The invention of claim 1, wherein the at least three conductors are adhesively captured by said carrying medium.

5. The invention of claim 1 further including at least one conductive ground plane.

6. The invention of claim 1, wherein disposed about each of the at least three conductors is an insulation material.

7. The invention of claim 6, wherein the insulation material has a higher melt temperature than an adhesive which captures the at least three conductors.

8. The invention of claim 6, wherein the insulation material is selected from a group consisting of: polyurethane, polyimide, porous polytetrafluoroethylene, polytetrafluoroethylene, and fluorinated ethylenepropylene.

9. The invention of claim 6, wherein disposed on the insulation material of each of the at least three conductors is a conductive material.

10. The invention of claim 9, wherein the conductive material is selected from a group consisting of: copper, aluminum, a carbon-filled fluoropolymer, gold, a metal plated polymer, silver, a plated fluoropolymer, and a plated porous polytetrafluoroethylene material.

11. The invention of claim 1, wherein said carrying medium is comprised of a material selected from a group consisting of: porous polytetrafluoroethylene, porous expanded polytetrafluoroethylene, polytetrafluoroethylene, fluorinated ethylenepropylene, perfluoroalkoxy polymer, polyester and polyimide.

12. In a data storage device, a ribbon interconnect for electrically connecting a read/write head to an electrical circuit component, the ribbon interconnect having a length, the read/write head being defined by separate read and write transducer elements, the interconnect comprising:
   at least one carrying medium; and
   at least three conductors captured by the carrying medium in a coplanar arrangement, the at least three conductors defining at least first and second conductor pairs, the pitch of the conductors of each of said conductor pairs being constant throughout the length of said ribbon interconnect, wherein the characteristic impedance of one of the conductor pairs and the characteristic impedance of another of said conductor pairs are not equal, wherein when the ribbon interconnect is electrically connected to the read/write head, the read/write head is freely moveable with respect to said ribbon interconnect.

13. In a data storage device, a ribbon interconnect for electrically connecting a read/write head to an electrical circuit component, the ribbon interconnect having a length, the read/write head being defined by separate read and write transducer elements, the interconnect comprising:
   at least one carrying medium; and
   at least a first, a second and a third electrical conductor captured by the carrying medium in a coplanar arrangement, said at least first and second electrical conductors defining a pitch therebetween which is less than a pitch defined between the at least first and third electrical conductors and a pitch between said at least second and third electrical conductors, wherein when the ribbon interconnect is electrically connected to the read/write head, the read/write head is freely moveable with respect to said ribbon interconnect.

* * * * *